United States Patent [19]

Hayama et al.

[11] Patent Number: 5,089,291
[45] Date of Patent: Feb. 18, 1992

[54] METHOD FOR FORMING HARD COAT ON POLYOLEFIN

[75] Inventors: Kazuhide Hayama; Noritaka Hosokawa; Takao Yazaki; Masataka Noro, all of Mie, Japan

[73] Assignee: Mitsubishi Petrochemical Co., Ltd., Tokyo, Japan

[21] Appl. No.: 295,396

[22] Filed: Jan. 10, 1989

[30] Foreign Application Priority Data

Jan. 12, 1988 [JP] Japan .................................. 63-4082

[51] Int. Cl.$^5$ .......................... B05D 3/02; B05D 3/06; B05D 7/04
[52] U.S. Cl. .................................. 427/54.1; 428/520; 428/516; 522/121
[58] Field of Search ................ 428/520, 516; 522/121; 427/54.1

[56] References Cited

U.S. PATENT DOCUMENTS

| | | | |
|---|---|---|---|
| 4,543,318 | 9/1985 | Maeda et al. | 522/121 |
| 4,692,396 | 9/1987 | Uchida | 522/121 |
| 4,904,737 | 2/1990 | Sato et al. | 522/121 |
| 4,936,936 | 6/1990 | Rohrbacher | 428/516 |

FOREIGN PATENT DOCUMENTS 0021369 1/1981 European Pat. Off. .

OTHER PUBLICATIONS

Chemical Abstracts, vol. 106, No. 12, Mar. 1987, p. 88.
Chemical Abstracts, vol. 111, No. 18, Oct. 1989, Abstract No. 155996p.

*Primary Examiner*—Evan Lawrence
*Assistant Examiner*—Cary A. Veith
*Attorney, Agent, or Firm*—Oblon, Spivak, McClelland, Maier & Neustadt

[57] ABSTRACT

A method of forming a hard coat on a polyolefin base, a composite laminate or a formed article is disclosed, which comprises coating the surface of the polyolefin base with an ultraviolet-curable resin composition comprising (a) a polymer containing at least 80% by weight of methyl methacrylate and/or a modified polymer containing at least 80% by weight of methyl methacrylate and having introduced into the side chain thereof a (meth)acryloyl group, (b) a polyfunctional acrylate containing at least 50% by weight of dipentaerythritol hexaacrylate, the weight ratio of components (a) to (b) being from 1 to 10, and (c) a photopolymerization initiator, drying the coating to form an ultraviolet-curable resin layer, and curing the ultraviolet-curable resin layer by irradiation with ultraviolet light.

5 Claims, No Drawings

5,089,291

METHOD FOR FORMING HARD COAT ON POLYOLEFIN

FIELD OF THE INVENTION

This invention relates to a method for forming a hard coat on polyolefins, and more particularly to a method for producing a polyolefin product, such as films, sheets, and formings, having a hard coat formed thereon, which is excellent in surface hardness and surface gloss and is therefore suitable as various industrial parts, e.g., automobile parts and appliance parts, constructional parts, and furniture parts.

BACKGROUND OF THE INVENTION

Polyolefins are more lightweight and formable than metals or glass and excellent in appearance (transparency and gloss) and mechanical characteristics, and are hence applied widely as various industrial parts for automobiles, appliances, and the like.

However, since polyolefin products lack mar resistance, they are liable to surface damages (marring) by scuffing or scratching in some uses.

If an ultraviolet curable acrylic coating, such as polyester acrylate, urethane acrylate, and epoxy acrylate, which is generally applied to methacrylic resins or polycarbonate resins is coated on polyolefins and cured in an attempt to improve mar resistance of the polyolefins, sufficient adhesion cannot be achieved, failing to have practical utility.

Moreover, in cases where a coating is applied to three-dimensional parts, as are often used as industrial parts, to form a hard coat thereon, coating may be performed by spray-coating. However, spray-coating onto formed parts is accompanied by a great loss of the coating material and also finds difficulty in obtaining a smooth coated surface enough to give excellent gloss.

These problems might be avoided by thermoforming a sheet having an ultaviolet-cured hard coat. This technique however is of no utility because the hard coat having been previously undergone crosslinking fails to follow stretch of the sheet to cause cracking.

SUMMARY OF THE INVENTION

One object of this invention is to provide a method for forming on a polyolefin base, such as a film, a sheet and a laminate, a composite laminate or a formed article, a hard coat having a pencil hardness of H to 4H and good adhesion to the polyolefin base.

Another object of this invention is to provide a method for forming a hard coat on a polyolefin base, a composite laminate, or a formed article, in which the polyolefin base or the composite laminate having an uncured coating can be subjected to forming, such as thermoforming, and the coating is then cured by ultraviolet irradiation, or the polyolefin base having no uncured coating can be laminated with other polyolefin film(s), a coating is performed and the coating is then cured by ultraviolet irradiation.

A further object of this invention is to provide a polyolefin base, a composite laminate or a formed article having improved mar resistance and excellent gloss.

The inventors considered that the above-described problems associated with the conventional techniques for forming a hard coat on polyolefin products would be settled by using an ultraviolet-curable resin which forms a film on solvent removal by drying and exhibits sufficient adhesion to a polyolefin base, a composite laminate or a formed article on curing by ultraviolet irradiation. As a result of extensive investigations, the inventors have found a resin composition meeting such a demand and completed the invention.

The present invention relates to a method of forming a hard coat on a polyolefin base, a composite laminate or a formed article which comprises coating the surface of the polyolefin base with an ultraviolet-curable resin composition comprising (a) a polymer containing at least 80% by weight of methyl methacrylate and/or a modified polymer containing at least 80% by weight of methyl methacrylate and having introduced into the side chain thereof a (meth)acryloyl group, (b) a polyfunctional acrylate containing at least 50% by weight of dipentaerythritol hexaacrylate, the weight ratio of components (a) to (b) being from 1 to 10, and (c) a photopolymerization initiator, drying the coating to form a ultraviolet-curable resin layer, and curing the ultraviolet-curable resin layer by irradiation with ultraviolet light.

DETAILED DESCRIPTION OF THE INVENTION

The polyolefin as a base on which a hard coat is formed includes polyethylene resins, polypropylene resins and mixtures thereof.

Included in the polyethylene resins are low-density polyethylene, high-density polyethylene, linear low-density polyethylene, linear high-density polyethylene, an ethylene-propylene copolymer, an ethylene vinyl acetate copolymer, and an ethylene-acrylic acid copolymer. The polypropylene resins include polypropylene, a propylene-ethylene copolymer, a propylenebutene-1 copolymer, a propylene-4-methylpentene-1 copolymer, and maleic anhydride-modified polymers obtained by grafting maleic anhydride to these polypropylene resins.

Preferred among these polyolefin resins are polypropylene resins. The polypropylene resins have higher heat resistance as compared with polyethylene resins so that they are less susceptible to heat shrinkage during drying for solvent removal after coating. In addition, the polypropylene resins have higher surface hardness than the polyethylene resins so that they are less causative of reduction of hardness of the hard coat formed thereon.

The resin composition according to the present invention is capable of forming an uncured film, which is curable by ultraviolet irradiation. The ultraviolet-curable resin composition comprises (a) a polymer containing at least 80% by weight of methyl methacrylate and/or a modified polymer containing at least 80% by weight of methyl methacrylate and having introduced into the side chain thereof a (meth)acryloyl group and (b) a polyfunctional acrylate containing at least 50% by weight of dipentaerythritol hexaacrylate, the weight ratio of components (a) to (b) being from 1 to 10, and (c) a photopolymerization initiator.

The terminology "(meth)acryloyl group" as used herein inclusively means an acryloyl group and a methacryloyl group. The terminology "(meth)acrylic acid" as used hereinafter inclusively means acrylic acid and methacrylic acid. Similar terminologies hereinafter used, e.g., ethyl (meth)acrylate, have the similar meaning.

The polymer containing at least 80% by weight of methyl methacrylate as component (a) includes polymethyl methacrylate and copolymers obtained from methyl methacrylate and other copolymerizable monomer(s).

Specific examples of the copolymerizable monomer include (meth)acrylic acid and esters thereof, e.g., methyl acrylate, ethyl (meth)acrylate, propyl (meth)acrylate, butyl (meth)acrylate, 2-ethylhexyl (meth)acrylate, lauryl (meth)acrylate, stearyl (meth)acrylate, cyclohexyl (meth)acrylate, benzyl (meth)acrylate, glycidyl (meth)acrylate, 2-hydroxyethyl (meth)acrylate, and 2-hydroxypropyl (meth)acrylate. If desired, these monomers may be used in combinations of two or more thereof.

The modified polymer comprising the above-described methyl methacrylate polymer having a (meth)acryloyl group in the side chain thereof can be prepared, for example, by addition reaction between a methyl methacrylate glycidyl (meth)acrylate copolymer having methyl methacrylate content of at least 80% by weight and (meth)acrylic acid, or addition reaction between a methyl methacrylate-(meth)acrylic acid copolymer having a methyl methacrylate content of at least 80% by weight and glycidyl (meth)acrylate, or addition reaction between a methyl methacrylate-2-hydroxyethyl (meth)acrylate copolymer having a methyl methacrylate content of at least 80% by weight and a reaction product obtained by reacting tolylene diisocyanate or isophorone diisocyanate and an equimolar amount of 2-hydroxyethyl (meth)acrylate.

If the methyl methacrylate content of the polymer as the component (a) is less than 80% by weight, the cured film of the ultraviolet-curable resin composition would have insufficient adhesion to the polyolefin base, the composite laminate or the formed article and insufficient mar resistance.

The component (b) is a polyfunctional acrylate containing at least 50% by weight of dipentaerythritol hexaacrylate and, if desired, other polyfunctional acrylate(s). The polyfunctional acrylate to be combined with dipentaerythritol hexaacrylate includes 1,4-butanediol diacrylate, neopentylglycol diacrylate, 1,6-hexanediol diacrylate, 2,2-bis[4-(acryloyloxydiethoxy)phenyl]propane, bis(acryloyloxyethyl)hydroxyethyl isocyanurate, tricyclodecanedimethyl diacrylate, trimethylolpropane triacrylate, pentaerythritol triacrylate, trimethylolpropane-propylene oxide adduct triacrylate, tris(acryloyloxyethyl) isocyanurate, pentaerythritol tetraacrylate, dipentaerythritol pentaacrylate, dipentaerythritol-caprolactone adduct acrylate, bisphenol A epoxy resin-acrylic acid adduct, and epoxy-novolak resin-acrylic acid adduct. Additionally included in the polyfunctional acrylates to be combined with dipentaerythritol hexaacrylate are adducts obtained by addition reaction between a polyisocyanate (e.g., tolylene diisocyanate, isophorone diisocyanate, hexamethylene diisocyanate) or a isocyanate prepolymer, which is obtained by reacting such a polyisocyanate and a polyol (e.g., polypropylene glycol, polytetramethylene glycol, polycaprolactone, a polycondensate of adipic acid and ethylene glycol), and a hydroxyl-containing acrylate (e.g., 2-hydroxyethyl acrylate, 2-hydroxypropyl acrylate, pentaerythritol triacrylate, dipentaerythritol pentaacrylate). These polyfunctional acrylates to be combined with dipentaerythritol hexaacrylate may be used either individually or in combinations of two or more thereof.

If the content of the polyfunctional acrylates other than dipentaerythritol hexaacrylate exceeds 50% by weight, adhesion of the cured film to the polyolefin base or the formed article becomes insufficient.

The components (a) and (b) are used at a (a)/(b) weight ratio of from 1 to 10. If the weight ratio is less than 1, the film formed by drying the coating applied on the polyolefin surface has deteriorated workability due to tackiness. If it exceeds 10, mar resistance of the cured film is insufficient.

In applying the resin composition onto the polyolefin base, the resin composition is usually dissolved in a solvent so as to have, a viscosity suitable for coating. The solvent which can be used includes aromatic hydrocarbons, e.g., benzene, toluene, and xylene; halogenated hydrocarbons, e.g., ethylene dichloride; esters, e.g., methyl acetate, ethyl acetate, and butyl acetate; ketones, e.g., acetone, methyl ethyl ketone, and methyl isobutyl ketone; dioxane; and cellosolve solvents; or mixtures of two or more thereof.

The amount of the solvent to be used is preferably selected so as to give a viscosity ranging from 10 to 30,000 cps (20° C.).

In order to impart ultraviolet-curability to the resin composition comprising the components (a) and (b), a photopolymerization initiator is added to the composition. The photopolymerization initiator to be used includes benzoin methyl ether, benzoin ethyl ether, benzoin isopropyl ether, benzoin butyl ether, diethoxyacetophenone, benzyl dimethyl ketal, 2-hydroxy-2-methylpropiophenone, 1-hydroxycyclohexyl phenyl ketone, benzophenone, Michler's ketone, isoamyl N,N-dimethylaminobenzoate, 2-chlorothioxanthone, and 2,4-diethylthioxanthone. These photopolymerization initiators may be used either individually or in combinations thereof. The amount of the photopolymerization initiator to be used is from 0.1 to 10 parts by weight, per 100 parts by weight of the component (b).

If desired, the ultraviolet-curable resin composition according to the present invention may further contain various additives commonly employed in this kind of resin compositions, such as heat polymerization inhibitor for preventing heat polymerization during preservation, e.g., hydroquinone, hydroquinone monomethyl ether, benzoquinone, catechol, p-t-butylcatechol, and phenothiazine; ultraviolet absorbents for improving film properties, e.g., salicyclic acid types, benzophenone types, benzotriazole types, and cyanoacrylate types; ultraviolet stabilizers, e.g., hindered amine types; anti block agents; slip agents; leveling agents; and the like.

The surface of the polyolefin base to be coated with the ultraviolet-curable resin composition of the present invention is preferably subjected to corona discharge treatment in a usual manner. The resin composition as dissolved in the above-recited solvent is coated on the polyolefin surface to a desired thickness by means of a coating means providing a uniform and smooth coating surface, e.g., a roll coater and a die coater, and then dried by heating to remove the solvent, to thereby obtain the polyolefin base having formed thereon an ultraviolet-curable resin layer.

The ultraviolet-curable resin layer has a thickness of from 1 to 50 μm, preferably from 3 to 30 μm.

Curing of the coating can be effected by irradiating ultraviolet light emitted from a commercially available light source, e.g., a xenon lamp, a low pressure mercury lamp, a high-pressure mercury lamp, an ultrahigh-pressure mercury lamp, a carbon arc lamp, a tungsten lamp, a metal halide lamp, etc., for a period of from 1 to 60 seconds.

In an embodiment of the present invention, a laminate having a metallic luster which can be obtained by laminating (i) a polyolefin base layer containing an inorganic fine powder, (ii) a polyolefin interlayer containing a metallic powder or mica flakes, and (iii) a polypropylene resin outer layer may be used as the polyolefin base.

The polyolefin of the base layer (i) preferably comprises from 30 to 70% by weight of a polypropylene resin and from 70 to 30% by weight of a polyethylene resin. The polyolefin having such a composition combines excellent rigidity and heat resistance attributed to the polypropylene resin and excellent impact resistance and deep drawing properties attributed to the polyethylene resin in a good balance.

The inorganic fine powder to be incorporated into the base layer includes particles of talc, calcined clay, heavy calcium carbonate, diatomaceous earth, barium sulfate, etc. having a particle size of not more than 15 $\mu$m. Preferred of them are those having a flaky form such as talc, from the standpoint of rigidity and deep drawing properties. The inorganic fine powder is used in an amount of from 20 to 80 parts by weight per 100 parts by weight of the polyolefin of the base layer (i).

In order to give greater prominence to the metallic luster of the polyolefin interlayer (ii) containing metallic powders or mica flakes, the polyolefin base layer (i) may contain pigments, e.g., carbon black, cadmium yellow, white lead, titanium oxide, and Malachite Green. Preferred of them is carbon black from the viewpoint of opacifying properties and deep drawing properties.

The base layer (i) preferably has a non-transparency of 80% or higher as measured according to JIS P-8138 and a thickness of from 1 to 4 mm.

The metallic powder to be incorporated into the polyolefin interlayer (ii) includes a powder of aluminum, copper, iron, zinc, etc. When light enters from the polypropylene resin layer (iii), the incident light is reflected on the base layer (i) to visually bring the metallic luster of the metallic powders or mica flakes out. To this effect, the metallic powders or mica flakes are preferably incorporated into the layer (ii) in an amount of from 0.05 to 10% by weight based on the layer (ii). The polyolefin for the layer (ii) preferably includes transparent resins, such as polypropylene resins and low-density polyethylene. If the resin is opaque, the back-up effects of the base layer (i) cannot be produced. The layer (ii) has a thickness of from 10 to 50 $\mu$m, preferably from 30 to 100 $\mu$m.

The laminate composed of the layers (i), (ii), and (iii) can be obtained by co-extrusion to provide a polyolefin base having a metallic luster and excellent thermoforming properties.

In another embodiment of the present invention, the polyolefin base having an uncured resin layer may be laminated with other polyolefin layers, such as (i) a polyolefin layer containing an inorganic fine powder, (ii) a polyolefin layer containing a colorant (pigment), a metallic powder, or a mica flake, optionally (iv) a polyolefin layer other than a polypropylene resin layer, and the like, and then the uncured resin layer is irradiated with ultraviolet light to produce a composite laminate having a hard coat.

The most, reasonable method for laminating these layers and the polyolefin base having an ultraviolet-curable resin layer on its surface comprises melt-kneading each of the polyolefin compounds for the layers (i) and (ii), and optionally the polyolefin compound for the layer (iv) in a commonly employed extruder, coextruding the molten compound from one T die to form a laminate, and uniting the polyolefin base having an ultraviolet-curable resin layer on its surface and the coextruded laminate into one body under pressure between rolls making use of the heat of the coextruded laminate.

If desired, the polyolefin base having an ultraviolet-curable resin layer formed thereon or a composite laminate thereof can be thermoformed by the use of a commercially available thermoforming machine, each as a vacuum forming machine, an air-pressure forming machine, hot plate-pressure forming machine, or a vacuum-pressure forming machine to which a forming mold of a desired form is fitted. The polyolefin base or its laminate is mounted on the mold with its both ends being clamped, softened by heating with an infrared or far infrared heater to a surface temperature of 120° to 220° C. and, immediately thereafter, initimately pushed onto the mold in vacuo or under air pressure, followed by cooling to obtain a formed article having a desired shape.

The polyolefin base, the composite laminate or the formed article is then irradiated with ultraviolet light as stated above to thereby cure the surface resin coating to form a hard coat.

The process in accordance with the present invention comprises coating an ultraviolet curable resin composition on the surface of a polyolefin base with a coating machine, e.g., a roll coater and a die coater, to form an ultraviolet-curable resin film and, if necessary, laminating the resulting polyolefin base with other polyolefin layers, thermoforming the polyolefin base or its laminate, and then curing the ultraviolet-curable resin. According to the construction of this invention, the hard coat formed on the surface of the polyolefin products, particularly formed articles, is excellent in surface smoothness and surface gloss.

The present invention is now illustrated in greater detail with reference to the following Examples and Comparative Examples, but it should be understood that the present invention is not deemed to be limited thereto. In these examples, all the parts and percents are given by weight unless otherwise specified.

EXAMPLE 1

A mixture of 100 parts of methyl methacrylate and 100 parts of toluene was heated to 80° C. At the time when the temperature reached 80° C. and after 2 hours and 4 hours from that time, a 0.15 part portion of azobisisobutyronitrile was added thereto, and the mixture was allowed to react at 80° C. for 6 hours to obtain a 50% toluene solution of a methyl methacrylate homopolymer.

A hundred parts of the toluene solution of polymethyl methacrylate, 20 parts of dipentaerythritol hexaacrylate, 5 parts of neopentylglycol diacrylate, 50 parts of toluene, and 2 parts of benzyl dimethyl ketal were mixed and dissolved to prepare an ultraviolet-curable resin composition.

The resin composition was coated on a 0.6 mm thick polypropylene sheet (pencil hardness: HB; 60° gloss: 71%) having been subjected to corona discharge treatment to a dry thickness of 10 $\mu$m and dried at 80° C. for 1 minute to obtain a coated sheet. The coated sheet was cured by irradiating with light emitted from a high-pressure mercury lamp (output density: 80 W/cm), while moving on a conveyer at a speed of 6 m/min, the high-pressure mercury lamp being placed perpendicular to the moving direction of the sample at a height of 9 cm.

The hard coat thus formed on the polypropylene sheet was evaluated for adhesion to the polypropylene sheet, pencil hardness, and 60° gloss according to the following test methods.

1) Adhesion:

The cured film formed on the polyolefin base, the composite laminate or the formed article was hatched with a cutter to make 100 squares (1 mm × 1 mm). Cello Tape (a trade name of an adhesive cellophane tape produced by Nichiban Co., Ltd.) was adhered thereon and then rapidly peeled off. The adhesion of the cured film to the polyolefin base, the composite laminate or the formed article was expressed as the number of squares remaining on the substrate.

2) Pencil Hardness:

Measured in accordance with JIS K5401.

3) 60° Gloss:

Measured in accordance with JIS Z8741.

As a result, the cured film had an adhesion of 100/100 (number of squares remaining/total number of squares), a pencil hardness of 2H, and a 60° gloss of 90%, proving excellent in adhesion, surface hardness, and gloss.

EXAMPLE 2

A mixture of 85 parts of methyl methacrylate, 15 parts of cyclohexyl methacrylate, and 100 parts of toluene was heated to 80° C. At the time when the temperature reached 80° C. and after 2 hours and 4 hours from that time, a 0.15 part portion of azobisisobutyronitrile was added to the mixture, and the mixture was allowed to react at 80° C. for 6 hours to obtain a 50% toluene solution of a methacrylate copolymer.

To a mixture of 100 parts of the resulting copolymer solution, 30 parts of dipentaerythritol hexaacrylate, 10 parts of tris(acryloyloxyethyl) isocyanurate, and 100 parts of toluene were added and dissolved 1 part of benzyl dimethyl ketal and 1 part of 1-hydroxycyclohexyl phenyl ketone to prepare an ultraviolet-curable resin composition.

A polypropylene sheet having a hard coat thereon was obtained in the same manner as in Example 1, except for using the above-prepared resin composition, and evaluated in the same manner as in Example 1. The results obtained are shown in Table 1.

EXAMPLE 3

A mixture of 90 parts of methyl methacrylate, 10 parts of glycidyl methacrylate, and 105 parts of toluene was heated to 80° C. At the time when the temperature reached 80° C. and after 2 hours and 4 hours from that time, a 0.15 part portion of azobisisobutyronitrile was added to the mixture, and the mixture was allowed to react at 80° C. for 6 hours. Then, the mixture was heated up to 110° C., and 5 parts of acrylic acid, 0.5 part of tetramethylammonium bromide, and 0.05 part of hydroquinone monomethyl ether were added thereto. The mixture was further reacted at that temperature for 6 hours to obtain a 50% toluene solution of a modified methacrylate copolymer having an acryloyl group in the side chain thereof.

In a mixture of 100 parts of the resulting copolymer solution, 25 parts of dipentaerythritol hexaacrylate, and 75 parts of toluene was dissolved 2 parts of 1-hydroxycyclohexyl phenyl ketone to prepare an ultraviolet-curable resin composition.

A polypropylene sheet having a hard coat formed thereon was produced in the same manner as in Example 1, except for using the above-prepared resin composition. The results of evaluations are shown in Table 1.

COMPARATIVE EXAMPLE 1

In a mixture of 100 parts of the modified copolymer solution as prepared in Example 3, 10 parts of dipentaerythritol hexaacrylate, 20 parts of pentaerythritol triacrylate, and 100 parts of toluene was dissolved 2 parts of 1-hydroxycyclohexyl phenyl ketone to prepare an ultraviolet-curable resin composition.

A polypropylene sheet having a hard coat formed thereon was produced in the same manner as in Example 1, except for using the above-prepared resin composition.

The performance properties of the hard coat were evaluated in the same manner as in Example 1 but were turned out unmeasurable since the hard coat separated from the polypropylene sheet.

COMPARATIVE EXAMPLE 2

In a mixture of 100 parts of the modified copolymer solution as prepared in Example 3, 4 parts of dipentaerythritol hexaacrylate, and 70 parts of toluene was dissolved 0.4 part of 1-hydroxycyclohexyl phenyl ketone to prepare an ultraviolet-curable resin composition.

A polypropylene sheet having a hard coat formed thereon was produced in the same manner as in Example 1, except for using the above-prepared resin composition and evaluated in the same manner as in Example 1. The results obtained are shown in Table 1.

TABLE 1

| Example No. | Adhesion | Pencil Hardness | 60° Gloss (%) |
| --- | --- | --- | --- |
| Example 1 | 100/100 | 2H | 90 |
| Example 2 | 100/100 | 3H | 87 |
| Example 3 | 100/100 | 2H | 91 |
| Comparative Example 1 | 0/100 | unmeasurable due to film separation | — |
| Comparative Example 2 | 30/100 | 2B | 85 |

EXAMPLE 4

The ultraviolet-curable resin composition as prepared in Example 1 was coated on a 40 μm thick polypropylene film having been subjected to corona discharge treatment to a dry thickness of 15 μm and dried at 80° C. for 1 minute to form an ultraviolet-curable resin layer.

Each of (i) a resin composition comprising 30% of polypropylene, 44.7% of high-density polyethylene having a specific gravity of 0.950, 25% of talc having an average particle size of 5 μm, and 0.3% of carbon black and (ii) a resin composition comprising 99.8% of polypropylene and 0.2% of an aluminum powder having an average particle size of 25 μm was melt-kneaded in a separate extruder at 230° C. The both molten blends (i) and (ii) were fed to the same T die and co-extruded from the die in a thickness of 50 μm and 2.8 mm, respectively, and the above-prepared polypropylene film having an uncured resin layer was superposed on the layer (ii) to obtain a composite laminate.

The resulting composite laminate was mounted on a forming mold (80 mm in height; 200 mm in width, 150 mm in length) fitted to an air-pressure forming machine. After the composite laminate was heated to a surface temperature of 150° C., it was thermoformed at an area ratio (area after forming/area before forming) of 3.87. The formed article was then irradiated with ultraviolet light emitted from an ultraviolet emitter to cure the ultraviolet-curable resin layer while moving on a conveyer at a speed of 0.8 m/min. There was obtained a formed article having a metallic luster and a hard coat formed thereon.

The hard coat was evaluated in the same manner as in Example 1 and found to have an adhesion of 100/100, a pencil hardness of 2H, and a 60° gloss of 89%, proving excellent in adhesion to the polypropylene film, surface hardness, and gloss.

EXAMPLE 5

A composite laminate was obtained in the same manner as in Example 4, except that the ultraviolet-curable resin composition as prepared in Example 1 was coated on a 25 μm thick biaxially oriented polypropylene film having been subjected to corona discharge treatment to a dry thickness of 5 μm, and the laminate was irradiated with ultraviolet light in the same manner as in Example 1.

The hard coat was evaluated in the same manner as in Example 1 and found to have an adhesion of 100/100, a pencil hardness of 2H, and a 60° gloss of 91%, proving satisfactory in adhesion to the polypropylene film, surface hardness and gloss.

EXAMPLE 6

A composite laminate was obtained in the same manner as in Example 4, except that the ultraviolet-curable resin composition as prepared in Example 1 was coated on a 40 μm thick propylene maleic anhydride graft copolymer (maleic anhydride content: 0.15%) film having been subjected to corona discharge treatment to a dry thickness of 10 μm, and the laminate was irradiated with ultraviolet light in the same manner as in Example 1.

As a result of evaluation, the hard coat of the resulting laminate was found to have an adhesion of 100/100, a pencil hardness of 2H, and a 60° gloss of 88%.

EXAMPLE 7

A composite laminate was obtained in the same manner as in Example 4, except that the resin composition (ii) comprised 99% of polypropylene and 1.0% of mica flakes coated with titanium oxide. The composite laminate was irradiated with ultraviolet light in the same manner as in Example 1.

The hard coat of the laminate was evaluated in the same manner as in Example 1 and was found to have an adhesion of 100/100, a pencil hardness of 2H, and 60° gloss of 90%.

While the invention has been described in detail and with reference to specific embodiments thereof, it will be apparent to one skilled in the art that various changes and modifications can be made therein without departing from the spirit and scope thereof.

What is claimed is:

1. A method of forming a hard coat on a polyolefin base, a composite laminate or a formed article which comprises directly coating the surface of the polyolefin base with an ultraviolet-curable resin composition comprising (a) at least one member selected from the group consisting of a polymer containing at least 80% by weight of methyl methacrylate, a modified polymer containing at least 80% by weight of methyl methacrylate having introduced into a side chain thereof up to 20% by weight acryloyl group, and a polymer mixture containing one polymer containing at least 80% by weight of methyl methacrylate and a second polymer containing at least 80% by weight methyl methacrylate and having introduced into a side chain thereof up to 20% by weight (meth)acryloyl group, (b) a polyfunctional acrylate containing at least 50% by weight of dipentaerythritol hexaacrylate, the weight ratio of components (a) to (b) being from 1 to 10, and (c) a photopolymerization initiator, drying the coating to form an ultraviolet-curable resin layer, and curing the ultraviolet-curable resin layer by irradiation with ultraviolet light.

2. A method as claimed in claim 1, wherein said photopolymerization initiator is present in an amount of from 0.1 to 10 parts per 100 parts by weight of the component (b).

3. A method as claimed in claim 1, wherein said method further comprises thermoforming the polyolefin base having formed thereon an ultraviolet-curable resin layer or composite layer thereof prior to the ultraviolet curing.

4. A method as claimed in claim 1, wherein said polyolefin base is a laminate composed of (i) a polyolefin base layer containing an inorganic fine powder, (ii) a polyolefin interlayer containing a metallic powder or mica flakes, and (iii) a polypropylene resin outer layer wherein the acrylic coating is applied to the polypropylene resin outer layer.

5. A method according to any preceding claim further comprising the step of laminating the coated base with other polyolefin layers prior to curing the ultraviolet-curable resin.

* * * * *